Sept. 9, 1969  G. R. MAHNKEN  3,465,411
ENVELOPE ATTACHING APPARATUS AND METHOD
Filed Aug. 21, 1967  2 Sheets-Sheet 1

INVENTOR.
GEORGE R. MAHNKEN
BY
Ralph R. Roberts
AGENT

Sept. 9, 1969 G. R. MAHNKEN 3,465,411
ENVELOPE ATTACHING APPARATUS AND METHOD
Filed Aug. 21, 1967 2 Sheets-Sheet 2

INVENTOR.
GEORGE R. MAHNKEN
BY
Raeph R Roberts
AGENT

United States Patent Office 3,465,411
Patented Sept. 9, 1969

3,465,411
ENVELOPE ATTACHING APPARATUS AND METHOD
George R. Mahnken, 369 Island Road,
Ramsey, N.J. 07446
Filed Aug. 21, 1967, Ser. No. 662,029
Int. Cl. B23p 19/04; B23q 17/00
U.S. Cl. 29—407                                    19 Claims

ABSTRACT OF THE DISCLOSURE

Apparatus for attaching envelopes to a strip includes a chute in which packaged articles are received and guided for assembly one-at-a-time to a strip of paper and the like. The discharge end of the chute has a reciprocating trap door adapted to receive and guide the packaged articles into contact with an actuating means to cause an attachment of the packaged product to a strip or ticket by means of a staple after which the reciprocating trap door is retracted to allow the attached package and a portion of the ticket to drop out of the way of the reciprocating trap door. Concurrently a portion of the ticket is advanced a determined distance and the trap door is moved forwardly to close the chute for receipt of the next packaged product into engagement with the actuating means to attach this next package to the ticket. The attaching of packages and reciprocation of the trap door is continued until the determined number of packages is attached to the ticket after which a knife cuts the advanced ticket portion and the determined number of packages attached thereto.

*Field of the invention.*—The particular art to which this invention pertains is broadly covered in the general class of Printing and in particular in the subclass with ticket machines in which tickets may be preformed and printed as they are issued or advanced forwardly and cut. This invention also may pertain to the general class of Elongated-Member Driving Apparatus which includes stapling and in the subclasses with control means responsive to sensed condition, and responsive to working feed means and subclasses with means to convey work or product relative to driving station and, with means to vary the timed relationship between the conveyor movement and the driver actuating means, and means when the control initiates the driver actuation.

*Description of the prior art.*—The automatic attaching of a plurality of enveloped packaged products to a strip or ticket presents many problems, especially when the product is loose bulk such as peanuts. In modern display arrangements it is desired that the envelope packages be each attached as by a single staple to a strip or ticket. A close overlapping arrangement wherein the outermost envelope is adapted to lie above the adjacent envelope in a spaced array provides a highly effective and desired display. The product of the present invention provides an array of five or six envelopes attached to a strip of determined length with the outermost and top bag overlying substantially all of the next bag.

In the present state of the art, envelope packaged products such as peanuts and the like are often provided with extended end portions having an aperture for mounting on rods or hooks. Maintaining this display presents the problem or arranging the older packages for first selection or sale and for counting the quantities sold from the display. The improved strip display overcomes these objections as the strip permits ready loading, ease of counting and reduces the probability of staleness. So far as is known, the assembling of envelope packaged products to a strip is performed by hand labor and manual manipulation. Gravity chutes for feeding articles are well known and stapling a plurality of items to a carrier member is shown in many patents such as U.S. Patent No. 3,305,154 to McCain, issued Feb. 21, 1967; U.S. Patent No. 3,221,965, to Mestre, issued Dec. 7, 1965, and U.S. Patent No. 3,191,838 to De Francis, issued June 29, 1965.

Insofar as is known, no apparatus or method provides for receiving an envelope packaged product in a chute or conveyor and for feeding this envelope to a predetermined actuation station wherein the presence or receipt of the package is detected. Each envelope as it is detected is attached by means of a staple or the like to a strip or ticket. No prior known apparatus or method provides for an adjacent portion of ticket to be advanced to the attachment position while the attached envelope and ticket portion is moved from the attaching station.

SUMMARY OF THE INVENTION

This invention pertains to apparatus for and a method of display packaging of loose products which are packaged in like size envelopes. These envelopes are attached by one end to a strip of heavy paper and the like to provide a determined grouping of packages. These packages are assembled on this strip for the purpose of counting and for improved display. In the apparatus of this invention it is contemplated that a chute or slide of determined width is adapted to receive the packages in an oriented manner and to transport these packages by gravity down the chute. The chute is provided with a terminal or distal portion arranged as a reciprocating trap door. As the product approaches the end of the chute it drops onto and in the way of the reciprocating trap door member and slides forwardly on the trap door portion until the envelope reaches its forwardmost position. In this position the envelope actuates a sensing and signal device which causes a mechanism to be actuated so as to attach the end of the envelope by means of a staple or the like to the strip. The strip is advanced to a determined position underneath the end of the envelope and after attachment of the envelope to the strip the movable portion of the chute is caused to be moved back allowing the attached package and a portion of the strip to drop by gravity to a position below the chute and substantially perpendicular to a support surface, which may be the floor.

After the envelope and strip portion is dropped through the trap door opening in the chute, the movable portion of the chute is once again brought forwardly to a determined position adjacent the mechanism. With the forward end of the chute in a closed position the next succeeding package is fed to and down the chute and is supported by this movable portion as the forward end of the envelope actuates the mechanism to cause a successive staple to be formed and advanced to attach this envelope to an adjacent portion of the ticket. This sequence is repeated for the determined number of times desired so as to attach a selected number of envelopes to the strip with the strip being advanced a small determined distance each time an envelope is attached. With each attachment of an envelope the chute is opened to permit the attached envelope and strip to drop through the opening. After a determined number of envelopes has been attached to the strip or ticket, the strip is cut by means of a knife allowing the attached envelopes and severed length of strip to be discharged from the attaching mechanism and be gathered for counting, packaging and/or for shipping to the final destination.

It is an object of this invention to provide an assembly apparatus for envelope package products in which a gravity type chute is provided with a retaining means for the receipt and guidance of an envelope package of determined size. The chute has its distal end formed with a movable portion adapted to move from in the way of the received envelope package so that the envelope package is dropped from its at rest position when the distal movable portion of the chute is moved backwardly. A ticket or strip advancing mechanism is provided to advance a small length of ticket outwardly of the mechanism and beneath the terminal or inward end of the chute so that the forward end of the received envelope package is brought over a portion of the top of the ticket and in the way of a stapling or similar attaching device. A signal actuating means is disposed so as to engage this forward end of the envelope package as the envelope reaches the distal end of the chute. The actuation of the mechanism causes a staple to be advanced and clenched as it attaches the envelope package to the ticket and finally the ticket feeding means is actuated to cause the ticket to be advanced and cut by means of a knife.

It is a further object of this invention to provide a method for the attaching of an envelope packaged product to a ticket or strip, such method including the steps of feeding an envelope and the like to and through a chute until the envelope reaches a determined point; sensing the receipt of the envelope at this determined point; feeding a portion of a strip or ticket to a point adjacent the end of the chute; attaching the envelope to the strip or ticket by means of a staple or the like; retracting or opening an end portion of the chute upon which the attached package is supported so that the package is dropped through the open chute portion; advancing a small portion of the ticket to provide a new ticket portion for the attachment thereto of a subsequent envelope; closing the chute so as to receive said subsequent envelope; repeating the procedure for as many envelopes as is desired to attach to the strip, and finally, cutting the strip at a determined point.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these claims that meet the requirement of pointing out the improvements, combinations and methods in which the inventive concepts are found.

There has been chosen a specific embodiment of an envelope attaching apparatus adapted for attaching envelope packaged products to a strip or ticket, this embodiment being chosen for the purposes of illustration and description of the apparatus and method, the assembly of the apparatus being shown in the accompanying drawings forming a part of the specification wherein:

BRIEF DESCRIPTION OF THE DRAWINGS

FIG. 5 represents in a lesser scale than FIG. 4, a fragmentary sectional side view of the distal portion of the chute with the envelope package in the envelope delivered position of FIG. 4 and being attached to a strip or ticket as by a staple or the like;

DESCRIPTION OF THE PREFERRED EMBODIMENT

Figure 1:
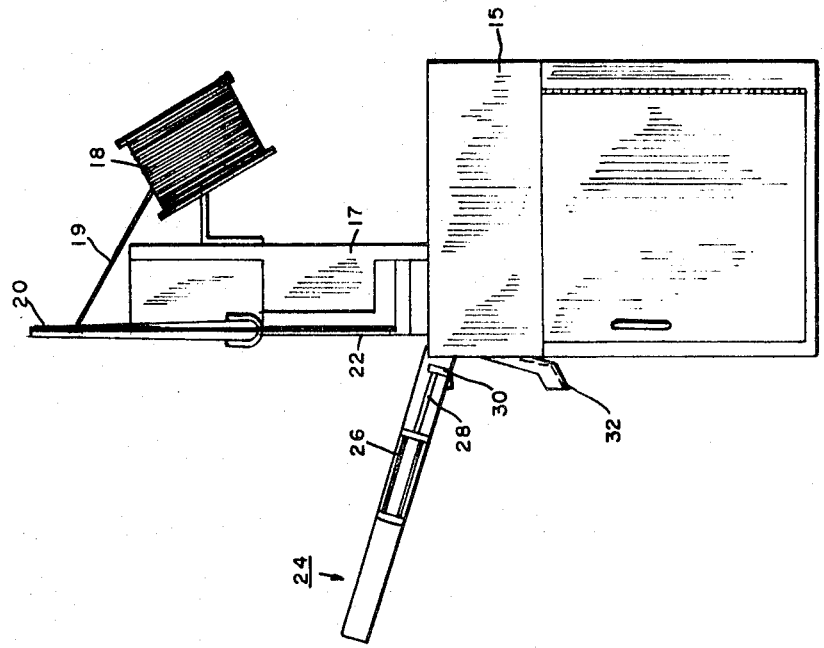
FIG. 1 represents a general side view of the apparatus of this invention and showing the contemplated disposition of the various elements or members comprising the mechanism for assembling and stapling a sequence of envelope packaged products to a strip or ticket.

Referring now to the drawings in detail wherein like numbers refer to like members throughout the several figures and in particular to FIG. 1 in which the assembly of the apparatus includes a base 15 adapted to support and enclose the motor drive and various electrical timing components. This drive and timing device is used to actuate the assembly mechanism in a manner and method to be hereinafter more fully described. This base 15 also provides a support for the stapling and conveying apparatus so that this mechanism is at a preferred or substantially convenient working height. Carried by and attached to this base is a pedestal 17 carrying on its rear upper portion a spool of wire 18 which is used for the formation of staples. A strand of wire 19 leading from the spool is guided to and through a tensioning device and guide 20 and extends thence downwardly to a staple head 22.

Extending leftwardly from and at an angle to the base 15 is a chute generally indicated as 24. In this embodiment the chute is adapted to receive, guide and by gravity feed a packaged product toward and to the base. The chute is disposed at a selected determined angle so that the packaged product slides at a determined speed within the chute.

Attached to the side of this chute and carried thereby is a pneumatic cylinder 26 whose piston rod 28 is connected at its outer end to a block 30, which block is attached to a movable bottom portion of the chute to be hereinafter more fully described. Below the chute 24 and carried by the base 15 is a discharge chute 32 which is adapted to receive and discharge the assembled envelopes and strip after they (the envelopes) have been sequentially attached to the ticket or strip and after the strip has been cut.

Figure 3:
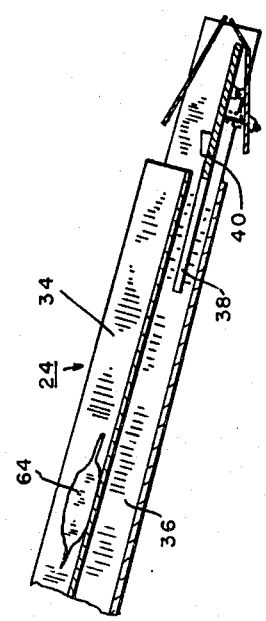
FIG. 3 represents a somewhat diagrammatic sectional side view of the chute of this invention and showing certain portions of the chute in section and with the upper outer portion of the chute broken away.

Referring next to FIG. 3, there is shown in greater detail the chute generally indicated as 24. This chute includes side guide members 34 which preferably are of polished metal. These side guide members 34 are carried by means of a support frame 36 so that guide members 34 may be adjusted within this frame and be supported at a determined angle to the base or a horizontal plane. Frame 36 is preferably of metal such as aluminum. The side portions of the frame 36 have a guide or slot 38 formed in each inwardly facing side portion of the support member. In this slot 38 is carried a movable plate 40 which is shaped and sized to slide within forward and rear limits and to provide a trap-door opening at least as large as the envelope.

Figure 4:
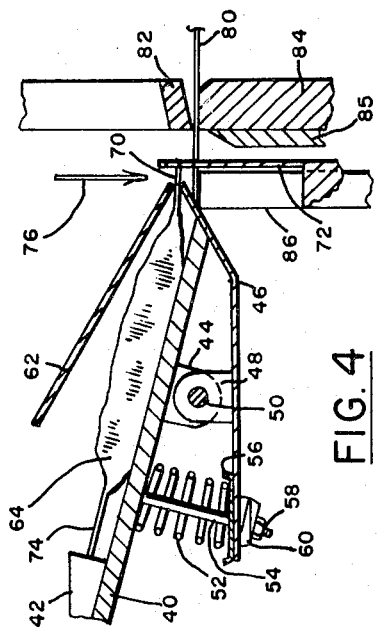
FIG. 4 represents in an enlarged scale, a fragmentary sectional side view of the distal or receiving end of the chute and showing the movable distal portion as it is adapted to receive and guide the forward end of an envelope of packaged product.

Referring next to FIG. 4, there is shown in enlarged detail the movable plate 40 which has mounted upon its surface a stop block 42. Attached to the under portion of plate 40 is a pair of ears 44 adapted to pivotally carry a hinged plate 46. This hinged plate 46 has its rightward or inner end bent at an angle to the main portion of the plate itself. The hinged plate which may also be made of sheet metal has formed therefrom or attached thereto a pair of ears 48 which are disposed to mate with the ears 44 extending downwardly from the plate 40. A pin 50 extends through both pairs of aligned ears to form a pivot or hinge support for the plate 46. The hinged plate 46, of course, is carried by and moves with the plate 40 as it is moved. A spring 52 of determined bias is mounted between the plate 46 and plate 40 and by means of a stud 54 is retained in position between these two plates. The lower end of the spring is retained in a cup 56 and by means of nut 58 and washer 60 the plate 46 is adjusted to the desired angular relationship with the plate 40.

Above plate 40 and at an angle thereto there is shown an upper guide lip 62 or deflector which is adapted to engage and guide the flexible forward end of an envelope package 64, this end being designated as 70. The upper deflector 62 is retained by guide and retaining means in the frame 36. The package 64 may contain peanuts or the like and may be of a size three or four inches square and with a package thickness such as one-half inch. The forward end portion 70 is sufficiently rigid to actuate a sensing means to be hereinafter described.

A leaf or tongue 72 is mounted so as to be in the way of the incoming end 70 and to engage this end when the envelope is moved inwardly to its maximum position. This leaf in this embodiment is the lever arm of a microswitch, not shown. When the package has been moved to this forward position, a rear end portion 74 of the package drops in the way of the forward edge of the clock 42 so that the package is precisely positioned and does not flip up or move out of the way during the attaching operation. A staple is advanced and driven through the end 70 and in this view the staple is indicated as by the arrow 76. It is to be understood that means other than staples may be used to attach the package to a support or carrying strip.

As reduced to practice, a support strip 80 is of cardboard or heavy paper defined as ticket stock. In the preparation of this strip there is provided perforations of selected like size and on a determined spacing. This ticket or strip 80 is advanced through a guide space provided by an upper guide block 82 and a support block 84. The upper guide block 82 has its underside formed at a guide angle to the advancing ticket. The ticket is supported by the block 84. A knife 85 is slidably carried in guides on the block 84 and is disposed adjacent the face of the block 84. A clinching block or anvil 86 is adapted to engage the ends of the staple and turn or clinch said ends as the end 70 of the envelope is brought downwardly upon and is stapled to that portion of the ticket 80 in the way of and resting on the block 86.

Figure 5:
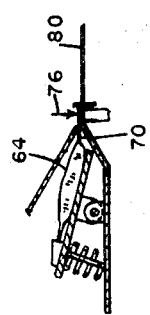

Referring now in particular to FIG. 5, it is to be noted that the envelope 64 which is upstream as shown in the chute in FIG. 3, has moved downwardly to the attaching position shown in FIG. 4 and has engaged the leaf 72. This sensing by the leaf 72 causes an actuation of the mechanism which forms a staple 76 which is driven through the end 70 of the envelope to attach this end to the strip 80.

Figure 7:
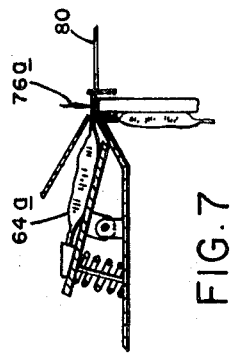
FIG. 7 represents the chute of FIGS. 5 and 6, but with the movable chute portion returned to the forward or closed position of FIG. 5 and with the first attached envelope now below the chute and hanging in substantially a vertical position and with a second envelope having been delivered to and moved down the chute to engage a sensing device for the attaching of said second envelope to the strip or ticket as by means of a staple or the like, and FIG. 8 represents the chute of FIG. 7 but with the movable portion of the chute again retracted or moved to its trap-door open position and with the second attached envelope having dropped downwardly to lay adjacent to and in the desired overlapping relationship to the first envelope.
Figure 6:
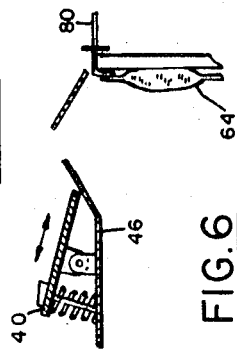
FIG. 6 represents the chute of FIG. 5 with the movable or distal portion of the chute moved backwardly to its trap-door open position and with the attached package dropped from the support chute.

Referring next to FIGS. 6 and 7, it is to be noted in FIG. 6 that the plate 40 has been moved backwardly as by means of the piston 26 and as the plate 40 moves backwardly the inner end of the pivoted bottom biased plate 46 is adapted to be deflected downwardly as it passes by the bulk portion of the envelope 64. As the plate 40 reaches the retracted or rearward position the envelope 64 and the portion of the ticket 80 to which it is attached drops down to hang downwardly normal to the plane of the ticket 80. At this time as seen in FIG. 7, the ticket is advanced leftwardly and the plate 40 is moved rightwardly so that a new portion of the ticket lies in the way of the incoming second package 64a. This incoming package, of course, engages the microswitch actuating finger 72 to cause a second staple 76a to be driven through the envelope and into and through the ticket 80 to attach the second envelope 64a to the strip 80.

Figure 8:
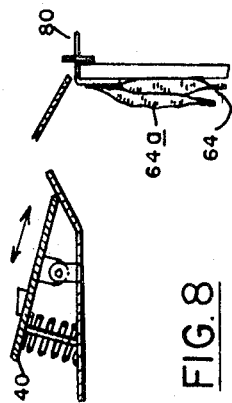

Referring next to FIG. 8, it is to be noted that once again the bottom portion of the chute 40 has been moved backwardly to the position as in FIG. 6 and providing an open trap-door permitting the second attached envelope package 64a to drop downwardly to lie against the first attached envelope package 64. An additional portion of the ticket 80 has been moved outwardly so that subsequent envelope packages may be attached.

The sequence of attaching envelopes continues until a determined number of envelope packages 64 are attached in spaced sequence on the ticket. This spacing is in accordance with a timing sequence to be described in conjunction with the ticket advancing mechanism.

Figure 2:
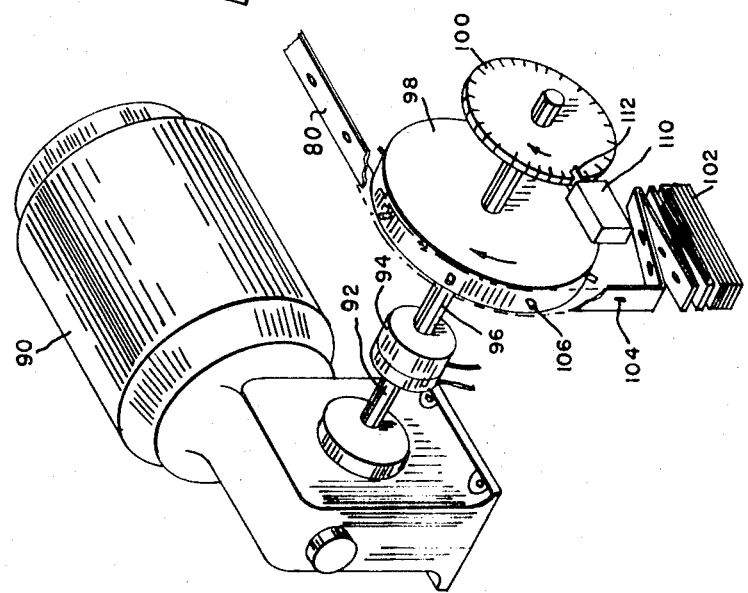
FIG. 2 represents a somewhat diagrammatic isometric view of a gear motor drive and ticket advancing mechanism of this invention and showing a means for providing a precise increment control for the advance of the ticket.

The ticket advancing mechanism is particularly seen in FIG. 2 and includes a gear motor 90 having an output shaft 92 engaging an electric clutch 94. This clutch engages and drives an output shaft 96 carrying a tooth wheel 98 and, as shown, the shaft 96 extends further forward to carry a timing wheel 100. The timing wheel 100 is provided with a series of notches which in the present instance total twenty-four. Four series of notches are formed in the periphery of wheel 100 with each series having the six notches on a determined equal spacing and between each group of notches there is a greater space. The greater sixth spacing is timed so that a greater portion of the ticket is advanced after the actuating of the knife.

As seen in the present embodiment, the strip or ticket 80 is accordion folded as at 102 and has perforations 104 of determined spacing. These perforations are sized to engage one of the plurality of pins 106 upon wheel 98 so that as the wheel 98 turns in the direction as indicated by the arrow, the ticket 80 as seen above and to the right of the wheel 98 is advanced forwardly. It is, of course, recognized that during the operating of the apparatus the gear motor 90 is started and runs continuously and that the electric clutch 94 is intermittently actuated to cause shaft 92 to rotate shaft 96. As shaft 96 is rotated the timing wheel 100 and toothed wheel 98 is equally rotated. A tongue mechanism 110 includes a solenoid and a switch and a finger 112. This finger is drawn out of the notch of the timing wheel 100 by the solenoid and in the out position engages the switch to cause an actuation of the electric clutch 94. By a timing means not shown the solenoid is deactivated and the tongue 112 slides on the surface of wheel 110 until it reaches and moves forwardly into the next notch. The forward movement of the tongue deactivates the switch and electric clutch.

OPERATION OF THE PREFERRED EMBODIMENT

In use, the apparatus of this invention is adapted to receive from a conveyor or other discharge device a plurality of envelope packages 64, which envelopes are fed to the apparatus usually at the rate of about sixty per minute. As each package is released it advances or slides down the chute 34 until it drops upon the plate 40, at which point the end 70 of the envelope moves through the guide opening provided by the bottom forward or rightward end of the plate 46 and the upper guide lip 62. The advancing end 70 engages the tongue 72 of the microswitch to cause an actuation of the switch. The switch actuates the staple and the clutch mechanisms so that the staple 96 is driven through the end of the envelope and into and through the ticket portion. After penetrating the envelope and ticket, the ends of the staple are turned or clinched on the block 86.

After the staple is driven and clinched, a timing means not shown causes an actuation of the solenoid 110 to be made so that the engaging tongue 112 is pulled backward from its engaged slot in the wheel 100. Immediately upon the retraction of this tongue the electric clutch 94 is engaged to cause the wheel 98 and the timing wheel 100 to rotate. As the clutch is engaged the solenoid 110 is deactivated releasing the tongue 112 to ride upon the periphery of the wheel 110. The tongue continues to ride the wheel and holds the engagement of clutch 94 until it reaches the next adjacent notch at which point it, the tongue, moves forwardly into the notch to cause the switch to deactivate the clutch thus stopping the rotation of shaft 96 and the advance of the ticket.

A sequence of attaching six envelopes uses one group of six notches and starts with tongue 112 engaged in the first of the six equally spaced notches on wheel 110. The leading end of the ticket 80 is positioned to extend slightly beyond the clincher block 86 to insure and permit the attachment of the first envelope. In the manner above-described a sequence of envelopes is attached to the ticket, each with the tongue engaged in one of the six equally spaced notches. The equal spacing of the notches provides five equal spaces between the six envelopes.

Upon the completion of the fifth equal advance of the ticket 80, the knife 86 is actuated to cut the ticket. The tongue 112 is withdrawn from the notch and engages the longer spacing for a longer ticket advance period to again project the leading portion of the ticket beyond the clincher block 86. The spacing between the staple and the knife is a determined distance and in the present embodiment is arranged so that a portion of the cut ticket extends beyond the upper end 70 of the sixth attached envelope. This spacing provides for and is timed to receive one of the apertures of the ticket so that this aperture is spaced adjacent to but immediately above the end of the last attached envelope 64. As each envelope package is fed down the chute, the end of the packages comes in the way of the microswitch to cause the actuation of the staple and other operations. This package impulse actuates a programming device or mechanism not shown which in turn controls the sequences of operations in the apparatus, one of which is the ticket or strip advance system. The series of notches counts and electrically controls the number of envelopes which is attached to the ticket before the ticket is cut and a new series of envelope packages are sequentially attached to the succeeding ticket.

METHOD OF ATTACHING OF THE PACKAGE

The novel concept of the method of attaching these envelope packages includes the following steps:

Feeding an envelope of a packaged product to and through a chute to a determined distal end of the chute;

Guiding the end of this package to and through a guideway to a determined limit;

Sensing the receipt of the end of this envelope package to actuate an attaching means;

Attaching the envelope package to a strip or ticket;

Advancing the strip or ticket a determined amount;

Retracting a distal portion of the chute to allow the attached envelope package and portion of ticket to fall from the support of the chute;

Returning the movable portion of the chute to its initial position, and

Repeating the above series of steps for attaching of the envelope a determined number of times to attach a selected number of envelope packages to the sequentially advanced ticket and finally, severing or cutting the ticket after a determined number of packages has been attached to the strip or ticket.

It is, of course, recognized that instead of a wire staple that the envelope may be attached to the ticket by other means. The ticket may be of thermoplastic or surface treated so that the envelope is attached by a plastic weld or the like. The end of the envelope may also be attached as by upset punching in which a punch-formed portion of the envelope is pushed through a like punched aperture or partial aperture in the ticket. Other means of attaching would include local gluing as well as forming tabs from the ticket and inserting and turning these tabs into and over suitable apertures in each envelope. The novel combination of chute, trap door, ticket advance and cutoff as used with the envelope attachment mechanism above described is necessary in these suggested alternate means of attachment.

It is also recognized that a power conveyor or belt may be used instead of a chute, such a conveyor could transport the envelopes at or in any desired plane and deliver them to a trap door section operable in the above manner and responsive to the receipt of an incoming envelope. Where the shape and thickness of the envelope permitted the trap door could be hinged and operated by a link and the like. The swinging end of the hinged trap door in its transcribed arc would need be absent an engagement of the attached hanging envelopes.

The spring 52, it is also noted, need not be a compression spring but may be a torque spring, a resilient bushing or like biasing element. It is desirable that the support plate 46 provide a guide for the envelope end 70 while still providing a means movable from in the way of the bulk of the package as the plate 40 is moved.

Although the exemplified mechanism is shown as having an electrical actuating and sequencing system it is readily apparent that a pneumatic system may be used. This system preferably would use many of the miniature components common in "fluidic systems." Instead of the leaf 72 a "fluidic" sensing device would be used, this device could include a small air discharge and a booster valve in combination therewith. When the discharge was closed by end 70 this booster would actuate or sequence various air cylinders and the like, these in turn would actuate the stapling head, the clutch, the plate 40 and the tongue 112. Other means of detection or sensing are available and practical, such means, of course, include electric eye systems and proximity systems. With any of these systems it is only necessary that the receipt and presence of the envelope end 70 be sensed and that in response thereto there is an actuation of the attaching means and programming of the ticket mechanism.

DEFINITIONS

The following definitions pertain to the above specification and as used therein include the following:

Ticket is a flexible strip of cardboard, plastic and the like, which strip may be ten to fifteen thousandths of an inch thick. The ticket is prepared for use in the apparatus by slitting to width from a larger roll. The strip has spaced apertures and may have printing thereon. The ticket strip is supplied in a coil or accordion-folded package.

Envelope packaged products, although as exemplified, the envelope packaged product is a square envelope made from substantially transparent film and heat-sealed at its ends, the packaged product is also contemplated as being skin-packages of hardware items such as nails, screws and the like. It is only necessary that the product be packaged in a manner so that packages have an end that is attachable to a ticket and that they be attached in a determined spaced sequence, preferably one-at-a-time. A plurality of envelopes, if desired, could be attached by each staple if the grouping was desired to be removed at the same time.

Clutch as exemplified is an electric responsive clutch but obvious equivalents include pneumatic, mechanical and spring actuated and the like.

Overlapping pertains to the overlaying of a substantial portion of one package by the next package. The overlapping is similar to shingles applied to a roof.

Terms such as "in," "out," "right," "left," "down," "up" and the like are applied to the envelope attaching apparatus as shown and described in conjunction with the drawings. These terms are used merely for the purposes of description and do not necessarily apply to a particular position in which the apparatus may be constructed or used.

The conception of the envelope attaching apparatus and the method of feeding and attaching of the envelopes to a ticket and its many applications is not limited to the examples above-described but departures therefrom may be made within the scope of the accompanying claims and protection is sought to the broadest extent the prior art allows.

What is claimed is:

1. In an apparatus for receiving and attaching to a ticket and in a determined overlapping array, a sequence of packaged products and the like, each attachment of a packaged product spaced so that it may be disengaged from the strip without disengaging the other attached packages, the attaching apparatus including: (a) a base; (b) a ticket adapted to be advanced to and supported at a determined position to the base; (c) means for advancing the ticket a selected distance in response to a signal actuation; (d) a conveying means for receiving and transporting in a determined manner a sequence of packaged products to an attaching position; (e) means for attaching the packaged product to the ticket; (f) a trap door at the discharge end of the conveying means, said trap door adapted to receive the incoming packaged product and support said packaged product during its attachment to the ticket after which the trap door is opened so that the attached packaged product and adjacent ticket portion is dropped through and below the trap door whence the trap door is moved again to its closed position to receive the next packaged product, and (g) means for cutting the ticket at a selected position and after a programmed number of packaged products has been attached.

2. A packaged product attaching apparatus as in claim 1 in which the ticket is advanced from a longer strip of determined length, the strip having apertures of selected size and spacing, the advancing of the ticket being in response to an actuation of a signal by a sensing device responsive to and adapted to detect the delivery of a packaged product to a selected position.

3. A packaged product attaching apparatus as in claim 1 in which the trap door is a plate member movable in a determined plane and within determined limits, said movable plate being moved to its trap-door open position in response to a signal programmed from the means for attaching.

4. A packaged product attaching apparatus as in claim 3 in which the movable plate of the trap door includes a hinged plate member adapted to engage and guide the leading end of the incoming packaged product; means for biasing said hinged plate to urge the plate to a selected guide position and against the bias to be cammed to an open position by the packaged product as the end of the hinged plate passes the bulk portion of the packaged product.

5. A packaged product attaching apparatus as in claim 4 in which there is provided means for adjustably limiting the movement of the hinged plate toward its guide position.

6. A packaged product attaching apparatus as in claim 4 in which the conveying means is a gravity chute having at its discharge end said trap door and an upper guide lip adapted to cooperate with the hinged plate to provide a determined guideway for the incoming end of the packaged product.

7. A packaged product attaching apparatus as in claim 6 in which the movable plate of the trap door is provided with a stop block having a forward edge adapted to engage the trailing end of the packaged product to restrain the movement of the packaged product during the attachment of the packaged product to the ticket.

8. A packaged product attaching apparatus as in claim 7 in which the movable plate of the trap door is reciprocated by means of a pneumatic cylinder actuated in response to the attaching means.

9. A packaged product attaching apparatus as in claim 1 in which the attachment of the packaged product to the ticket is by a wire staple.

10. A packaged product attaching apparatus as in claim 9 in which the staple is formed from wire provided by means of a coil of wire carried on a pedestal attached to the base, and the staple is clinched by means of a clinch block carried by the base, the block clinching surface disposed below the trap door.

11. A packaged product attaching apparatus as in claim 1 in which the means for advancing the ticket includes a toothed wheel having a plurality of spaced radially extending pins adapted to engage cooperatively sized apertures in a strip of ticket; a shaft adapted to rotatably support the toothed wheel; power means for rotating the toothed wheel a determined distance, and programming means for providing power to the power means for rotating the toothed wheel.

12. A packaged product attaching apparatus as in claim 1 in which the means for advancing the ticket includes a power source having a rotating output shaft, a clutch carried by this shaft and when actuated to transmit the rotation of the output shaft to a second shaft; a toothed wheel carried by said second shaft; a plurality of pins on the toothed wheel adapted to engage apertures in the ticket and advance the ticket as the second shaft is turned, and programming means for actuating the clutch for a determined length of time in response to a signal actuation from the attachment of the packaged product to the ticket.

13. A packaged product attaching apparatus as in claim 12 in which the programming means further includes a timing wheel carried by said second shaft and rotated therewith, the timing wheel having a series of notches formed in its periphery, said notches being selectively spaced; a tongue mechanism adapted to engage and slide on the periphery of the timing wheel and the notches therein, and signal means actuated by the movement of the tongue whereby the tongue is engaged in a notch, the clutch is deactivated and when the tongue is withdrawn from the notch the clutch is activated to rotate the timing wheel until the tongue reaches and engages the next notch.

14. A packaged product attaching apparatus as in claim 13 in which the timing wheel has a determined number of series of notches, each series having a plurality of notches of like spacing and in which the spacing between each series of notches is of a determined length; and in which the means for cutting the ticket is a knife actuated in response to the ticket advance to the last notch in the series.

15. A packaged product attaching apparatus as in claim 14 in which the sensing of the receipt of the packaged product at the attaching position is the actuation of a lever of a microswitch.

16. A packaged product attaching apparatus as in claim 15 in which the programming circuit and clutch are electrical.

17. The method of attaching a series of packaged products to a ticket including the following steps: (a) feeding an envelope of a packaged product to and through a conveying means and to a determined distal end; (b) guiding the end of this package to and through a guideway to a determined limit and position; (c) sensing the receipt of said end of the envelope package to actuate an attaching means; (d) attaching the envelope package to a positioned portion of a ticket; (e) opening a trap door portion of the distal end of the conveyor to allow the attached envelope package to fall from the support of the trap door; (f) advancing the ticket a determined amount; (g) returning the trap door portion of the conveyor to its closed position; (h) repeating the above series of steps for attaching of the envelope packaged product a determined number of times so as to attach each of a determined number of packages to sequentially advanced portions of the ticket, and (i) cutting the ticket after a determined number of packages has been attached to the ticket.

18. The method of attaching a series of packaged products as in claim 17 in which the conveying means is a gravity chute and the trap door is a movable plate reciprocated in the plane of the chute, said plate having a hinged plate member movable therewith, said hinged plate adapted to be cammed to an open position as the distal end passes by the bulk portion of the packaged product.

19. The method of attaching a series of packaged products as in claim 18 in which the attaching of the envelope packaged product is by means of a wire staple and in which the advancing of the ticket is a like distance between each packaged product in a series of packaged products and the cutting of the ticket is after the attachment of the last envelope packaged product in the determined series of attached products.

References Cited

UNITED STATES PATENTS

| | | | |
|---|---|---|---|
| 3,101,478 | 8/1963 | Oussani | 227—76 |
| 3,191,838 | 6/1965 | De Francis et al. | 227—7 |
| 3,415,035 | 12/1968 | Wickersheim | 29—208 X |

THERON E. CONDON, Primary Examiner

R. L. SPRUILL, Assistant Examiner

U.S. Cl. X.R.
29—208, 432; 53—3; 227—7